(12) United States Patent
Nunes et al.

(10) Patent No.: US 7,555,974 B2
(45) Date of Patent: Jul. 7, 2009

(54) FINNED SPINDLE LINER

(75) Inventors: James A. Nunes, Fillmore, CA (US); Curt Gelderman, Thousand Oaks, CA (US); William Tandrow, Simi Valley, CA (US); Nicholas M. Rocksvold, Santa Paula, CA (US)

(73) Assignee: Haas Automation, Inc., Oxnard, CA (US)

( * ) Notice: Subject to any disclaimer, the term of this patent is extended or adjusted under 35 U.S.C. 154(b) by 148 days.

(21) Appl. No.: 11/395,284

(22) Filed: Apr. 3, 2006

(65) Prior Publication Data
US 2007/0241571 A1    Oct. 18, 2007

(51) Int. Cl.
*B23B 13/08*    (2006.01)
*B23B 19/02*    (2006.01)

(52) U.S. Cl. .......................................... 82/163; 82/147
(58) Field of Classification Search .................. 82/147, 82/163, 155, 171, 903, 904, 124; 407/48, 407/40, 53, 103, 33, 34, 64
See application file for complete search history.

(56) References Cited

U.S. PATENT DOCUMENTS

| 4,058,036 | A | | 11/1977 | Austin |
| 4,149,437 | A | | 4/1979 | Winberg et al. |
| 4,526,072 | A | * | 7/1985 | Manhoff, Jr. .................. 81/451 |
| 4,788,895 | A | | 12/1988 | Spooner |
| 4,870,880 | A | | 10/1989 | Cantabery |
| 4,930,381 | A | * | 6/1990 | Spooner ...................... 82/163 |
| 5,649,460 | A | * | 7/1997 | Berns et al. .................. 82/126 |
| 5,927,169 | A | | 7/1999 | Hinson |
| 6,227,084 | B1 | * | 5/2001 | Cucchi ........................ 82/126 |
| 6,634,263 | B2 | * | 10/2003 | Trusty et al. ................. 82/1.11 |
| 6,978,706 | B2 | * | 12/2005 | Berns t al. .................... 82/163 |

* cited by examiner

*Primary Examiner*—Willmon Fridie
(74) *Attorney, Agent, or Firm*—McDermott Will & Emery LLP (57) ABSTRACT

A spindle liner including an axial sleeve having an axial length and an inner bore for receiving a stock piece is provided. The spindle liner further includes fins extending radially outward from the axial sleeve for supporting the axial sleeve within a spindle. Each fin extends along the axial length of the spindle liner. The spindle liner may be extruded from a high density material such as high density polypropylene, polyvinyl chloride or nylon and molybdenum disulfide. The spindle liner may further include an retaining flange attached to a distal end of the spindle liner.

21 Claims, 7 Drawing Sheets

FINNED SPINDLE LINER

FIELD OF THE INVENTION

The present invention generally relates to bar feeding systems for metal turning machine tools and, more particularly, relates to spindle liners for bar feeding systems.

BACKGROUND OF THE INVENTION

Metal turning machine tools such as lathes frequently include a hollow spindle through which bar stock or stock pieces of different diameters are fed to a cutting head. When a stock piece with a diameter less than the inner diameter of the hollow spindle is fed through the spindle, it is desirable to use a spindle liner to constrain the stock piece to a concentric rotation with the spindle, to prevent undesirable wobble or "whip."

One conventional spindle liner takes the form of a cylindrical reducing tube with an inner diameter and shape configured to slidably receive and support a stock piece, and an outer diameter equal to or slightly less than that of the inner diameter of the spindle. Such a conventional reducing tube is either cast or machined from metal or urethane. Another conventional approach to spindle liners has provided cylindrical tubes with inner diameters for accommodating stock pieces, coupled with annular bearings or O-rings with an outer diameter equal to the inner diameter of the hollow spindle.

These conventional approaches to lining a hollow spindle experience a number of problems. Because of the wide variety of stock piece and spindle shapes and sizes, it can become prohibitively expensive to manufacture a comprehensive set of spindle liners capable of reducing a variety of spindle sizes to a variety of stock piece sizes and shapes. Further, the manufacture of cast spindle liners requires expensive and time-consuming post-cast machining to remove defects and improve tolerances. Further, the mass of conventional spindle liners greatly increases the moment of inertia of the spindle, resulting in additional wear on the spindle and the machine tool. Finally, the nature and extent of the contact area between conventional spindle liners and the spindle may render insertion and removal of the liner difficult.

Accordingly, there is a need for a spindle liner having low production costs, reduced mass, and simplified insertion and removal. The present invention satisfies these needs and provides other advantages as well.

SUMMARY OF THE INVENTION

In accordance with the present invention, a finned spindle liner is inexpensively produced by extruding a material such as high density polypropylene, polyvinyl chloride ("PVC"), nylon lubricated with molybdenum disulfide or the like. The finned shape of the liner allows it to reduce the diameter of the hollow spindle of a metal turning machine tool without greatly increasing the rotational inertia of the spindle assembly. Because the fins are oriented in axial, rather than annular, contact with the inner surface of the spindle, insertion and removal of the finned liner can be accomplished with reduced effort. The fins also provide vibration damping, permitting the spindle to rotate more quickly.

According to one embodiment, the present invention is a spindle liner. The spindle liner includes an axial sleeve with an axial length and an inner bore for receiving a stock piece. The spindle liner further includes a plurality of fins extending radially outward from the axial sleeve. The plurality of fins are for supporting the axial sleeve within a spindle. Each fin of the plurality of fins extends along the axial length.

According to another embodiment, the present invention is a method of manufacturing a spindle liner. The method includes extruding a spindle liner body. The spindle liner body has an axial sleeve having an axial length and an inner bore. The inner bore is for receiving a stock piece. The spindle liner body further includes a plurality of fins extending radially outward from the axial sleeve. The plurality of fins are for supporting the axial sleeve within a spindle. Each fin of the plurality of fins extends along the axial length of the spindle liner body. The method further includes cutting the spindle liner body to a desired axial length.

According to yet another embodiment, a spindle liner system of the present invention comprises a first liner and a second liner. The first liner includes a first axial sleeve having a first axial length and a first inner bore, and a first plurality of fins extending radially outward from the first axial sleeve. Each fin of the first plurality of fins extends along the first axial length. The first plurality of fins is for supporting the first axial sleeve within the spindle. The second liner includes a second axial sleeve having a second axial length and a second inner bore for receiving a stock piece, and a second plurality of fins extending radially outward from the second axial sleeve. Each fin of the second plurality of fins extends along the second axial length. The first inner bore is for receiving the second liner, and the second plurality of fins is for supporting the second axial sleeve within the first inner bore of the first liner.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
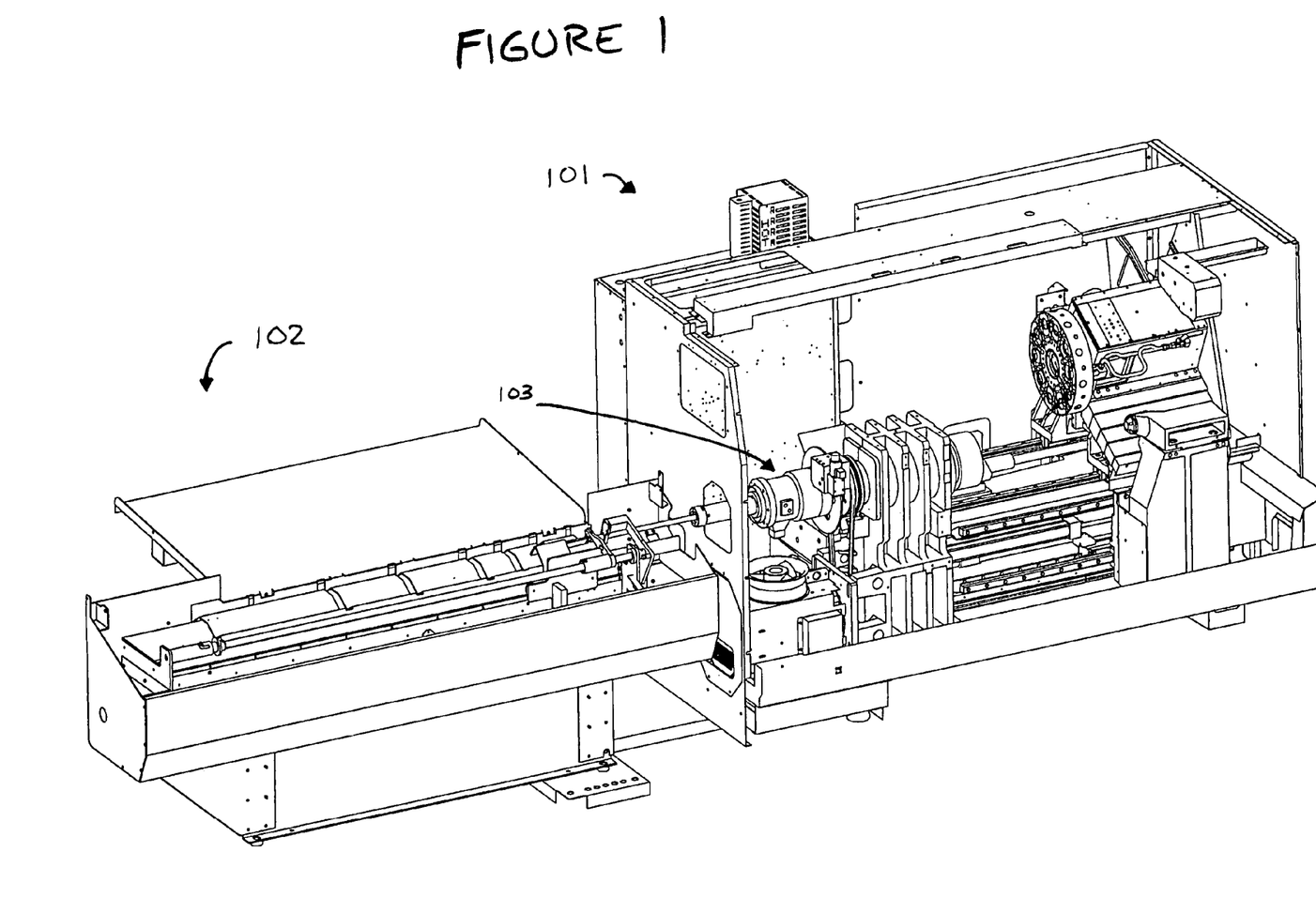
FIG. 1 depicts a metal turning machine tool fed by an automatic stock feeder, in which a spindle liner of the present invention is utilized.
Figure 2:
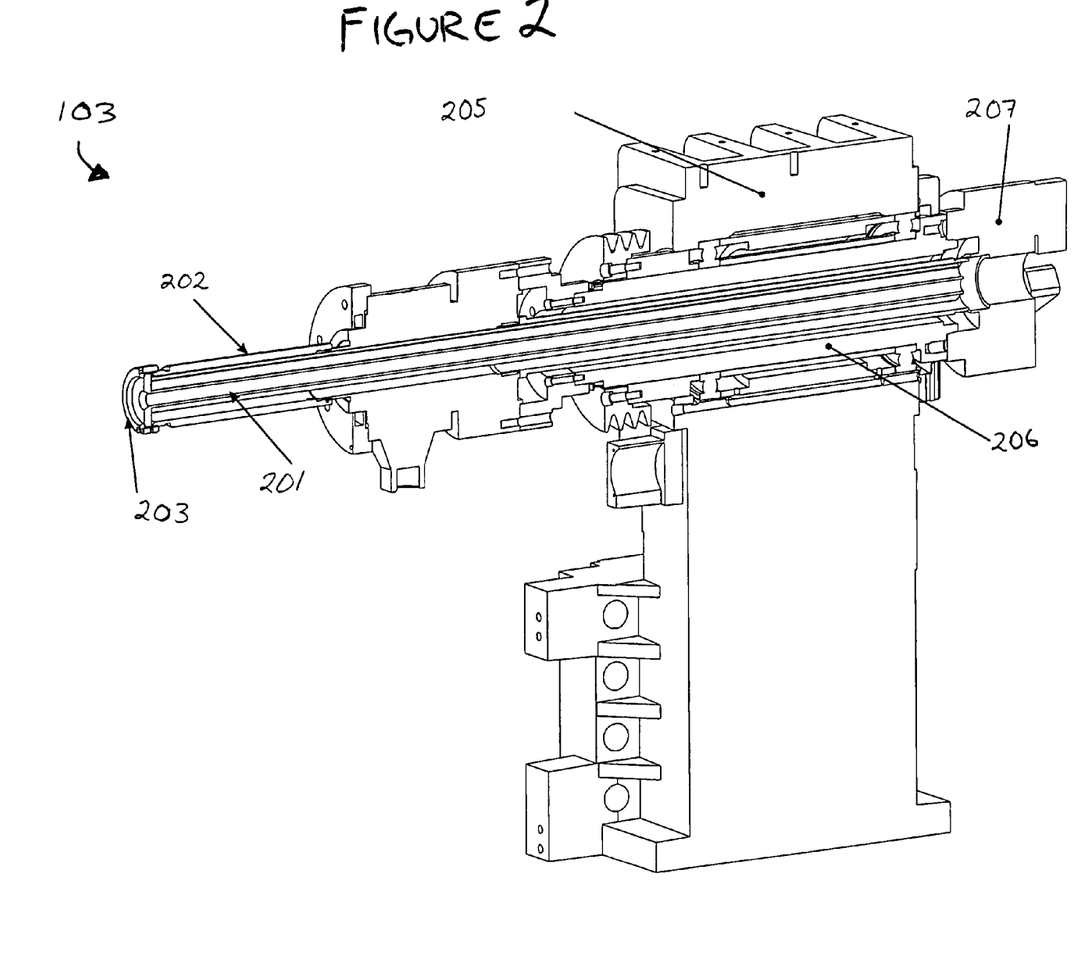
FIG. 2 depicts a partial cut-away view of a spindle assembly of a metal turning machine tool in which a spindle liner of the present invention is utilized.
Figures 3A, 3B, 3C, 3D:
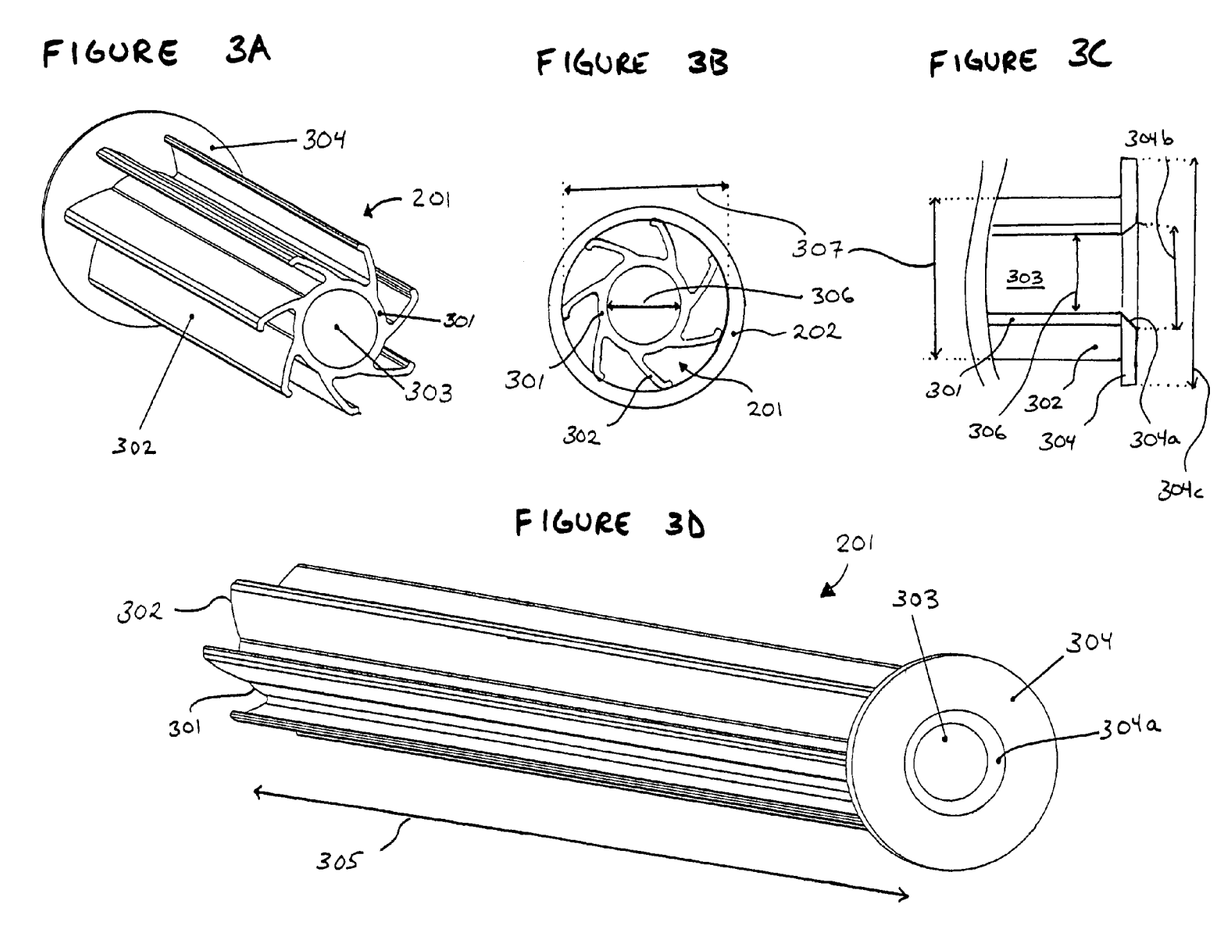
FIGS. 3A-3D depict perspective views of a spindle liner according to one embodiment of the present invention.

FIG. 1 depicts a metal turning machine tool 101 and an automatic stock feeder 102 in which a spindle liner of the present invention can be used. Machine tool 101 includes spindle assembly 103, which is illustrated in greater detail in the partial cut-away view of FIG. 2. Spindle assembly 103 includes a spindle housing 205, through which passes a spindle 206, in which is disposed a spindle liner 201. Spindle liner 201 is secured to spindle 206 by connecting retaining device 203 to liner adapter 202. Retaining device 203 may be a retainer plate, a retaining flange, an end cap, or any one of a number of retaining devices known to one of skill in the art. Stock pieces are fed through spindle 206, held in concentric rotation therewith by spindle liner 201, to chuck 207, where the stock pieces are machined by a cutting head (not illustrated).

Referring to FIGS. 3A-3D, spindle liner 201 is illustrated in further detail. According to one embodiment of the present invention, spindle liner 201 includes an axial sleeve 301 having an axial length 305. Spindle liner 201 further includes multiple fins 302 extending radially outward from axial sleeve 301, each fin 302 extending along axial length 305. Axial sleeve 301 of spindle liner 201 further includes an inner bore 303 for slidably receiving a stock piece. The inner bore passes through and defines the inner diameter 306 of axial sleeve 301. In the present exemplary embodiment illustrated in FIGS. 3A-3D, the cross-sectional shape of inner bore 303 is circular. In other embodiments, the cross-sectional shape of inner bore 303 may be hexagonal, square, octagonal, or any other shape, within the scope of the present invention, as described more fully below.

Fins 302 define the outer diameter 307 of spindle liner 201, which is designed to be substantially equal to an inside diameter of spindle 202. The outer diameter 307 of spindle liner 201 is the diameter of the circle which the outer edges of fins 302 define. Fins 302 center axial sleeve 301 in a spindle 202 of a metal turning machine tool. Axial sleeve 301 slidably receives a stock piece with an outer diameter and shape corresponding to the inner diameter 306 and shape of inner bore 303. Spindle liner 201 thereby allows a stock piece of a different diameter and/or cross-sectional shape than the interior of the spindle to be concentrically rotated with spindle 202 and securely fed to the machine tool.

Because fins 302 are oriented to extend along axial length 305 of spindle liner 201, they enable the spindle liner to be more easily inserted and removed from a spindle than would a spindle liner without fins or with annular fins. This is because the axially-oriented fins have reduced contact with the interior surface of the spindle, and what contact they have is oriented along the directions of insertion and removal. An additional benefit of the present invention is that fins 302 of spindle liner 201 permit the spindle liner to center a stock piece in a spindle without requiring the increased mass and moment of inertia of a conventional reducing tube that fills the gap between a stock piece and the spindle with solid material. This decreased mass and moment of inertia enables the spindle to safely rotate more quickly. In addition to the decreased rotational inertia, the relatively thin wall of axial sleeve 301 permits higher inner diameter tolerances, thereby reducing vibration and permitting higher rotational speeds.

While fins 302 of spindle liner 201 are described as extending radially outward, it is not necessary that the fins be oriented parallel to the radial direction. For example, fins 302 are illustrated as extending radially outward from axial sleeve 301, at an angle from the radial direction. Nevertheless, fins 302 extend in a direction having a radial component, and thus extend from the outer surface of axial sleeve 301 to the inner surface of a spindle (not illustrated).

While FIGS. 3A-3D depict a spindle liner with seven fins, the scope of the present invention is not limited to spindle liners with seven fins. Any number of fins greater than or equal to three may be used. An odd number of fins is preferred, however, in order to ensure that at least three fins will be in contact with the spindle. This will tend to better center the axial sleeve and the stock piece in the spindle than will an even number of fins.

A spindle liner of the present invention may be configured in any size necessary to adapt a particular stock piece to a particular spindle. Spindles typically have a length between 12" and 50", and an inner diameter between 1.5" and 4.5". Stock pieces typically have an outer diameter between 0.125" and 3". According to one embodiment of the invention, a clearance gap of about 0.0625" is left between the stock piece and the inner bore of the spindle liner, and a clearance gap of about 0.03125" is left between the outer diameter of the spindle liner and the inner diameter of the spindle. One skilled in the art will recognize that the foregoing dimensions may vary without departing from the scope of the invention.

According to one aspect of the present invention, spindle liner 201 is manufactured by extrusion. Because axial sleeve 301 and plurality of fins 302 have a constant cross-sectional shape, extrusion of axial sleeve 301 and plurality of fins 302 as a single body offers cost advantages over traditional casting and molding techniques, which require expensive and time-consuming post-cast machining. With an appropriately designed die having the desired cross-sectional shape, raw material can be pushed or drawn through the die to form a liner body (e.g., the axial sleeve 301 and plurality of fins 302), which can then be cut to a desired axial length. Spindle liner 201 may be extruded from any material suitable for extrusion, although high density materials are preferred, such as, for example, high density polypropylene, PVC, nylon lubricated with molybdenum disulfide, and the like. Depending upon the material used, spindle liner 201 may be extruded hot or cold. While manufacturing spindle liners by extrusion offers cost advantages over traditional casting and machining methods, spindle liners configured according to the present invention may be manufactured using other techniques without departing from the scope of the invention.

Spindle liner 201 further includes a retaining device 304 disposed at a distal end of axial sleeve 301. Retaining device 304 may be a retainer plate, a retaining flange, an end cap, or any one of a number of retaining devices known to one of skill in the art. The retaining device 304 illustrated in FIGS. 3A-3D is configured as a retaining flange, having an outer diameter 304c greater than the outer diameter 307 of the plurality of fins 302 to help secure spindle liner 201 to spindle 202. Retaining device 304 is attached to a distal end of axial sleeve 301 and fins 302 by thermal welding, or by any one of a number of attachment methods known to those of skill in the art, such as, for example, sonic welding, hot gluing, or the like. A retaining device, such as retaining device 304, may be configured in any number of ways. According to one aspect of the present invention, a retaining device is configured to be secured to a flange plate on a spindle with fasteners, such as bolts. According to another aspect of the present invention, a retaining device is configured to be retained within a spindle by a retaining cap and one or more fasteners, such as nuts. As will be apparent to one of skill in the art, a retaining device of the present invention may be configured in any number of ways to secure the spindle liner to a spindle and thereby constrain the spindle liner to concentric rotation at the same angular velocity as the spindle.

Retaining device 304 also includes a "lead-in" tapered section 304a, which tapers from a wider opening 304b at an end surface of retaining device 304 to the relatively narrower inner diameter 306 of inner bore 303. Depending on the axial thickness of retaining device 304, lead-in tapered section 304a may be gradually or abruptly tapered. Lead-in tapered section 304a acts like a funnel to help direct a stock piece into inner bore 303 of spindle liner 201.

Figure 4A:
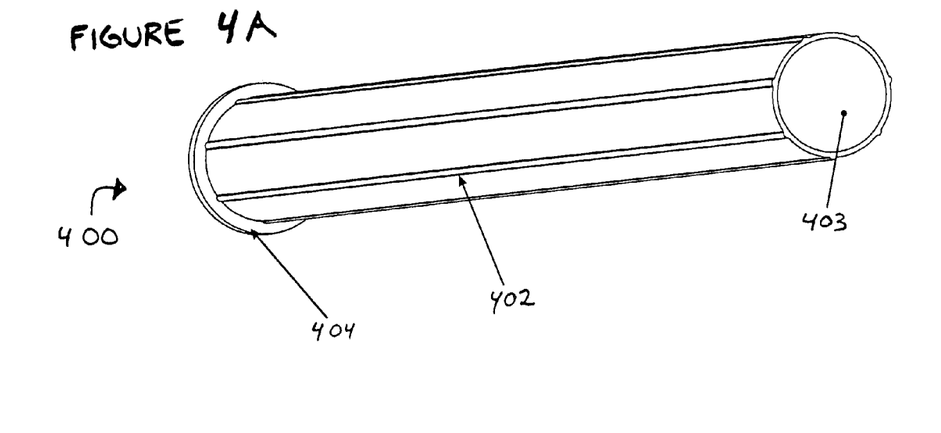
FIGS. 4A and 4B depict perspective views of a spindle liner according to another embodiment of the present invention.
Figure 4B:
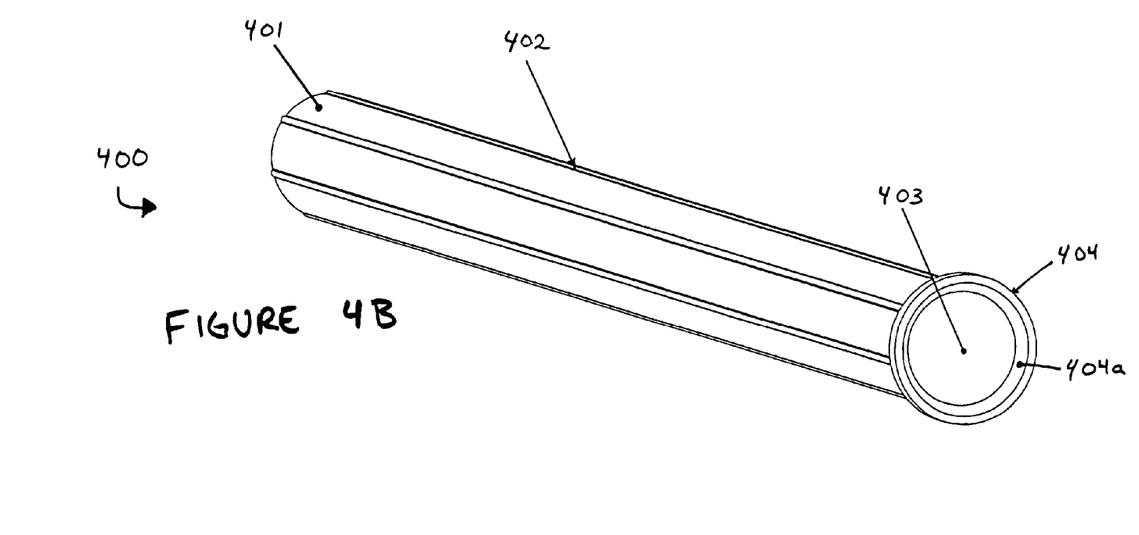

Turning to FIGS. 4A and 4B, a spindle liner 400 is illustrated according to another embodiment of the present invention. Much like spindle liner 201 illustrated in FIGS. 3A-3C, spindle liner 400 includes an axial sleeve 401 and a plurality of fins 402 extending radially outward from axial sleeve 401, each fin 402 extending along the axial length of axial sleeve 401. Spindle liner 400 is configured to adapt a stock piece of an outer diameter closer in diameter to a spindle than was spindle liner 201. Accordingly, the plurality of fins 402 are substantially shorter than those of spindle liner 201 illustrated in FIGS. 3A-3C. Axial sleeve 401 of spindle liner 400 further includes an inner bore 403, which passes through and defines the inner diameter of axial sleeve 401. Spindle liner 400 further includes a retaining flange 404 with a lead-in tapered section 404a, which tapers from a wider opening at an end surface of retaining flange 404 to the inner diameter of inner bore 403 to help direct a stock piece into spindle liner 400.

Figure 5A:
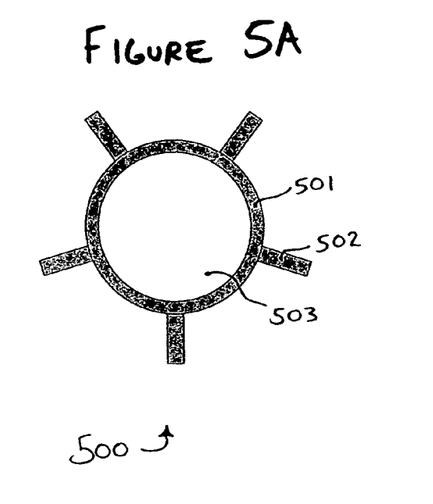
FIGS. 5A-5D depict various geometries of a spindle liner according to several aspects of the present invention.

FIGS. 5A-5D depict several geometries in which a spindle liner of the present invention may be configured. FIG. 5A depicts spindle liner 500, including axial sleeve 501 and a plurality of fins 502. The inner bore 503 of spindle liner 500 has a circular cross-sectional shape, while the plurality of fins 502 are substantially planar. The fins of spindle liner 500 may terminate at their most radially distant end in a bulge or a taper, according to the various manufacturing restrictions that may be imposed by the process of extruding a spindle liner, but these fins are understood to be substantially planar nonetheless.

The design and use of extrusion allow for relatively thin wall thicknesses for the axial sleeve and fins. The axial sleeve and plurality of fins of a spindle liner of the present invention may have any wall thickness within the limits determined by the spindle liner material, the spindle size and the stock piece to be centered therein. Thin walls help to reduce the mass and rotational inertia of spindle liner 500, as well as improving the manufacturing tolerances and minimizing stock piece movement relative to spindle liner 500. Moreover, thin walls allow the fins of a spindle liner to provide vibration damping while rotating, thereby permitting a spindle to safely rotate more quickly. Thin walls also permit tighter tolerances of axial sleeve 501, reducing radial movement of a stock piece relative to axial sleeve 500, and thereby further reducing vibration while rotating. Where the spindle liner is composed of a material with some deformability, fins with thin wall thicknesses act as shock absorbers to further limit any vibration induced by non-concentric rotation of a stock piece within a spindle. Further, thin walls reduce the amount of material used in extrusion, further reducing the cost of the spindle liner.

According to one exemplary embodiment of the present invention, a wall thickness of axial sleeve 501 is between about 0.07" to about 0.09", and a wall thickness of the plurality of fins 502 is between about 0.07" to about 0.09". The scope of the present invention is not limited to wall thicknesses in this range, however, but includes wall thicknesses of any dimensions within the limits set by the material of the liner and the relationship of the interior diameter of the spindle and the size of the stock piece to be accommodated.

Figure 5B:
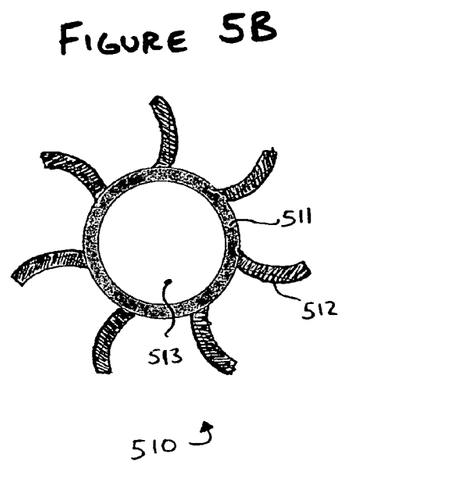
Figure 5C:
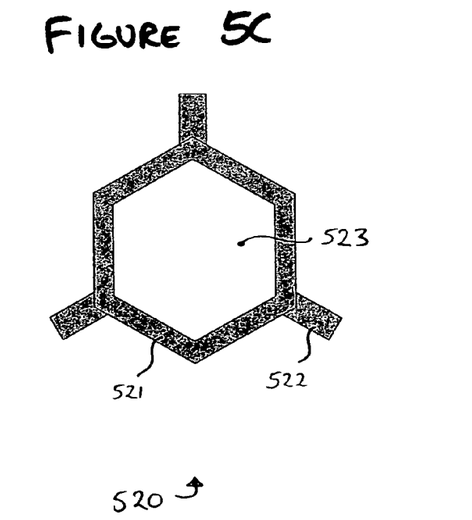

FIG. 5B depicts spindle liner 5 10, including axial sleeve 511 and a plurality of fins 512. The inner bore 513 of spindle liner 5 10 has a circular cross-sectional shape, while fins 512 are curved. The fins of a spindle liner may be curved smoothly (characterized by a lack of corners) or in steps (characterized by one or more corners). As shown in FIG. 5B, fins 512 are smoothly curved. The curvature of fins 512 assists in inserting and removing spindle liner 510 from a spindle. Where the spindle liner is composed of a material with some deformability, the curved fins are more easily displaced in the direction of their curvature (i.e., the clockwise direction in FIG. 5B) than in the opposite direction. Thus, a spindle liner with curved fins, such as spindle liner 510, could be inserted into or removed from a spindle while slowly rotating the spindle liner in the direction opposite the curvature of its fins (so that the inner surface of the spindle displaces the fins in the direction of their curvature, effectively reducing the outer diameter of the spindle liner and easing the insertion or removal process). FIG. 5C depicts spindle liner 520, including axial sleeve 521 and a plurality of fins 522. The inner bore 523 of spindle liner 520 has a hexagonal cross-sectional shape, while the plurality of fins 522 are substantially planar.

Figure 5D:
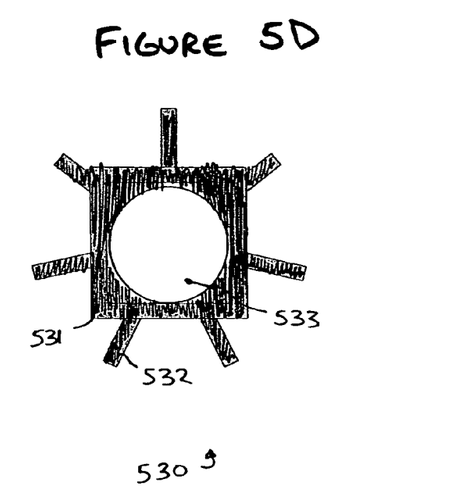

FIG. 5D depicts spindle liner 530, including axial sleeve 531 and a plurality of fins 532. The inner bore 533 of spindle liner 530 has a circular cross-sectional shape, while axial sleeve 531 has an outside surface with a cross-sectional shape that is square. Fins 532 are substantially planar. As illustrated in FIG. 5D, an axial sleeve of the present invention need not have a uniform wall thickness, and may have an inner bore with a cross-sectional shape different from that of the outside of the axial sleeve. An inner bore that has a common cross-sectional shape with the axial sleeve is generally preferred, however, as a uniform wall thickness permits tighter manufacturing tolerances. Moreover, the wall thickness of the axial sleeve may differ from the wall thickness of the fins, or it may be the same.

While the spindle liners depicted in FIGS. 5A-5D are illustrated as having fins with constant wall thicknesses, the scope of the present invention is not limited to such an arrangement. Fins with non-constant wall thicknesses, such as fins that taper or bulge, may also be used. Further, while the fins of the spindle liners illustrated in FIGS. 5A-5D form a sharp angle where they meet the axial sleeve, the scope of the present invention is not limited to such an arrangement. In alternative embodiments of the invention, the fins of a spindle liner may form a rounded corner, a shoulder and/or a gradual widening where they meet the axial sleeve. The foregoing variations in the shape of the fins may be used to strengthen the spindle liner or may be due to limitations in the extruding process.

Figures 6A, 6B:
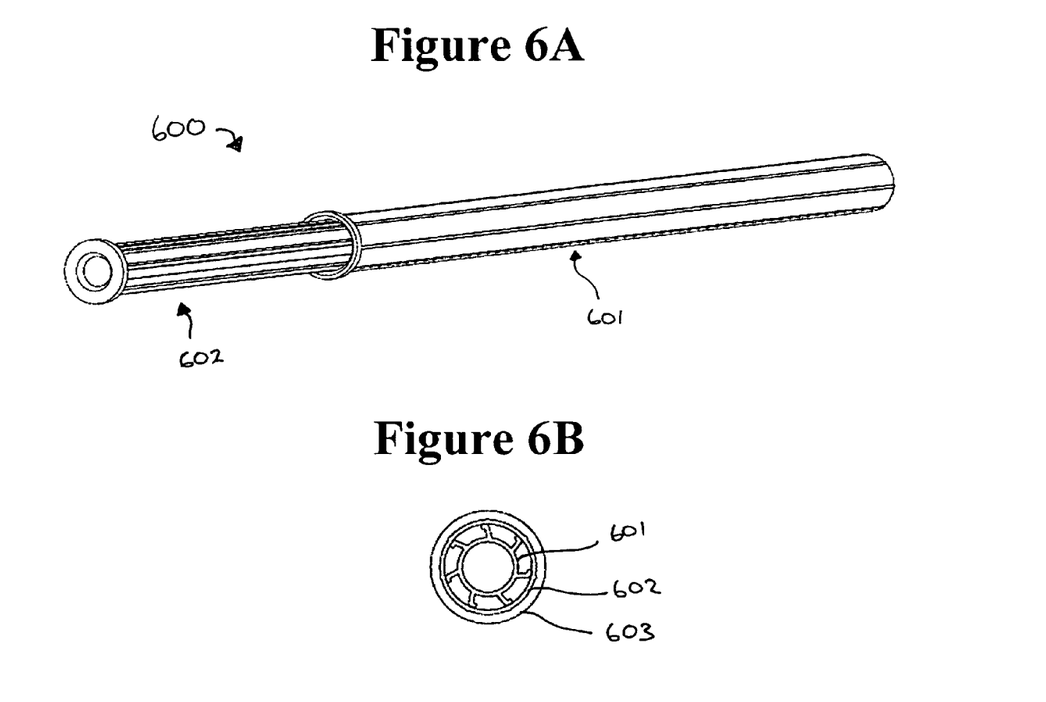
FIGS. 6A-6C depict various views of a spindle liner system according to another embodiment of the present invention.
Figure 6C:
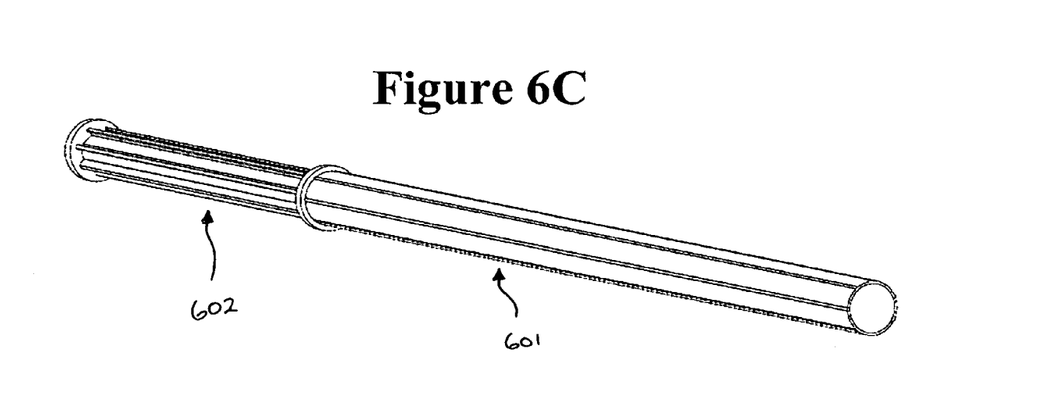

According to another embodiment of the present invention, a finned spindle liner system having multiple finned liners is used to adapt a stock piece to a spindle. FIGS. 6A-6C illustrate such a spindle liner system according to one embodiment of the present invention. Spindle liner system 600 includes a first liner 601 and a second liner 602. First liner 601 and second liner 602 each have an inner bore and a plurality of fins, as described more fully above with reference to the finned spindle liners illustrated in FIGS. 3A-3D and 4A-4B. First liner 601 acts to reduce the inner diameter of a spindle 603 to an intermediate size, which is then further reduced by second liner 602 to the size and cross-sectional shape of a stock piece. The fins of first liner 601 support the axial sleeve of spindle liner 601 within spindle 603. Rather than receiving a stock piece, however, the inner bore of first liner 601 is for receiving second liner 602. The fins of second liner 602 support the axial sleeve of second liner 602 within the inner bore of first liner 601. The inner bore of second liner 602 is for receiving a stock piece.

According to one embodiment of the present invention, a finned spindle liner system may include a single first liner for reducing a spindle to an intermediate inner diameter and any one of a number of second liners with different size inner bores, whose outer diameter is substantially equal to the inner diameter of first liner 601. According to another embodiment, a finned spindle liner system may include a number of first liners with different outer diameters and the same inner diameter, each for reducing different size spindles to a single intermediate diameter, and a number of second liners having the substantially the same outer diameter as the inner diameter of the first liner, each for adapting different size stock pieces to the intermediate diameter. By nesting spindle liners in this manner, a set of relatively few spindle liners can be used to adapt a large variety of stock pieces to a large variety of spindle sizes. One skilled in the art will recognize that the foregoing arrangements of nested spindle liners may vary without departing from the scope of the invention.

Figure 7:
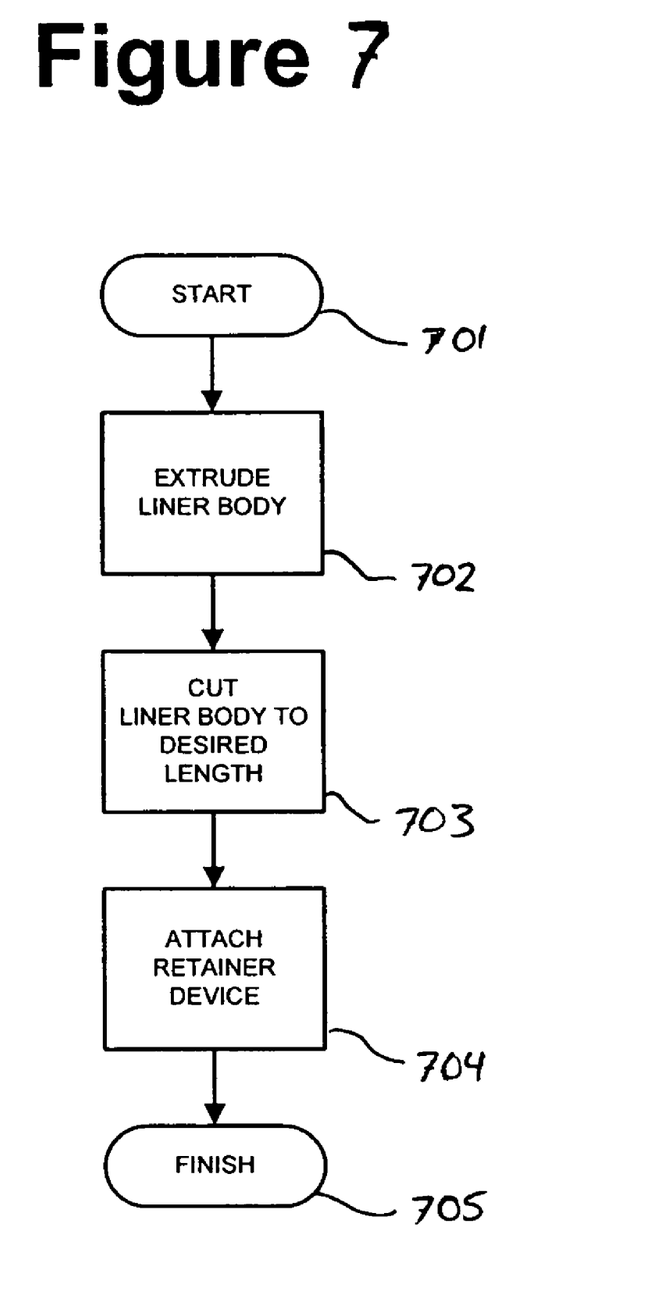
FIG. 7 is a flowchart depicting a method of manufacturing a spindle liner, according to yet another embodiment of the present invention.

Turning now to FIG. 7, a method of manufacturing a spindle liner such as the liners described above with reference to FIGS. 3A-3D and 4A-4B is depicted according to one embodiment of the present invention. The process begins at step 701, and a spindle liner body is extruded in step 702. The spindle liner body is a single extruded piece that includes an axial sleeve having an axial length, and a plurality of fins extending radially outward from the axial sleeve, each fin extending along the axial length. Because the spindle liner body has a constant cross-sectional shape, extrusion offers cost advantages over traditional casting and molding techniques, which require expensive and time-consuming post-cast machining. With an appropriately designed die having the desired cross-sectional shape, such as those shown in FIGS. 5A-5D, raw material is pushed or drawn through the die to form a liner body (e.g., the axial sleeve and plurality of fins). A spindle liner of the present invention may be extruded from any material suitable for extrusion, although high density materials are preferred, such as, for example, high density polypropylene, PVC, nylon lubricated with molybdenum disulfide, and the like. Depending upon the material used, spindle liner may be extruded hot or cold.

The spindle liner body is cut to a desired axial length in step 703. The desired axial length is determined by the length of the spindle for which the spindle liner is designed. In step 704, a retaining device is attached, if desired, to a distal end of the spindle liner body. A retaining device may be a retainer plate, a retaining flange, an end cap, or any one of a number of retaining devices known to one of skill in the art. A retaining device may be attached to a distal end of the spindle liner body by thermal welding, or by any other appropriate method, such as, for example, sonic welding or hot gluing. The process terminates at step 705.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A spindle liner comprising:
   an axial sleeve having an axial length and an inner bore for receiving a stock piece; and
   a plurality of fins extending radially outward from the axial sleeve, the plurality of fins for supporting the axial sleeve within a spindle,
   wherein each fin of the plurality of fins extends along a portion of the axial length of the axial sleeve, and
   wherein the spindle liner has a uniform cross-sectional shape along the portion of the axial sleeve from which the plurality of fins extends.

2. The spindle liner of claim 1, wherein the axial sleeve and the plurality of fins are a single extruded body.

3. The spindle liner of claim 1, wherein the axial sleeve and the plurality of fins comprise high density polypropylene, nylon and molybdenum disulfide, or polyvinyl chloride.

4. The spindle liner of claim 1, wherein the number of fins is odd.

5. The spindle liner of claim 1, wherein the number of fins is at least 3.

6. The spindle liner of claim 1, wherein the inner bore of the axial sleeve has a circular cross-sectional shape.

7. The spindle liner of claim 1, wherein the inner bore of the axial sleeve has a hexagonal cross-sectional shape.

8. The spindle liner of claim 1, wherein the inner bore of the axial sleeve has a square cross-sectional shape.

9. The spindle liner of claim 1, wherein the inner bore of the axial sleeve and an outside of the axial sleeve have a common cross-sectional shape.

10. The spindle liner of claim 1, wherein an outer diameter of the plurality of fins is substantially equal to an inner diameter of the spindle.

11. The spindle liner of claim 1, wherein each of the plurality of fins is substantially planar.

12. The spindle liner of claim 1, wherein each of the plurality of fins is curved.

13. The spindle liner of claim 1, further comprising a retaining flange for securing the spindle liner to a spindle, the retaining flange being disposed at a distal end of the axial sleeve and the plurality of fins.

14. The spindle liner of claim 13, wherein the retaining flange is thermally welded or sonically welded to the distal end.

15. The spindle liner of claim 13, wherein the retaining flange includes a lead-in tapered section tapering from an opening at an end surface of the retaining flange to an inner diameter of the inner bore of the axial sleeve.

16. A method of manufacturing a spindle liner, the method comprising:
   extruding a spindle liner body including an axial sleeve having an axial length and an inner bore, the inner bore for receiving a stock piece, the spindle liner body further including a plurality of fins extending radially outward from the axial sleeve for supporting the axial sleeve within a spindle, each fin of the plurality of fins extending along a portion of the axial length of the axial sleeve; and
   cutting the spindle liner body to a desired axial length,
   wherein the spindle liner has a uniform cross-sectional shape along the portion of the axial sleeve from which the plurality of fins extends.

17. The method of claim 16, wherein the spindle liner body is extruded from high density polypropylene, nylon and molybdenum disulfide, or polyvinyl chloride.

18. The method of claim 16, further comprising the step of attaching a retaining flange to a distal end of the spindle liner body.

19. The method of claim 18, wherein the retaining flange is attached to the distal end of the spindle body by thermal welding or by sonic welding.

20. A spindle liner system comprising:

a first liner including:
- a first axial sleeve having a first axial length and a first inner bore; and
- a first plurality of fins extending radially outward from the first axial sleeve, each fin of the first plurality of fins extending along the first axial length, the first plurality of fins for supporting the first axial sleeve within the spindle; and a second liner including:
- a second axial sleeve having a second axial length and a second inner bore for receiving a stock piece; and
- a second plurality of fins extending radially outward from the second axial sleeve, each fin of the second plurality of fins extending along the second axial length, wherein the first inner bore is for receiving the second liner, and the second plurality of fins is for supporting the second axial sleeve within the first inner bore of the first liner.

21. The spindle liner system of claim 20, further comprising a plurality of second liners, each of the plurality of second liners having an inner bore, each of the inner bores having a different inner diameter.

* * * * *